United States Patent
Xu

(10) Patent No.: US 8,058,859 B2
(45) Date of Patent: Nov. 15, 2011

(54) PULSE FREQUENCY MODULATION METHODS AND CIRCUITS

(75) Inventor: Peng Xu, Santa Clara, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 182 days.

(21) Appl. No.: 11/216,435

(22) Filed: Aug. 30, 2005

(65) Prior Publication Data

US 2006/0043953 A1    Mar. 2, 2006

Related U.S. Application Data

(60) Provisional application No. 60/605,462, filed on Aug. 30, 2004.

(51) Int. Cl.
*G05F 1/575* (2006.01)
(52) U.S. Cl. .................................................... 323/284
(58) Field of Classification Search .................. 323/284, 323/282, 283, 285, 288, 351
See application file for complete search history.

(56) References Cited

U.S. PATENT DOCUMENTS

| | | | | |
|---|---|---|---|---|
| 5,568,044 A | * | 10/1996 | Bittner | 323/272 |
| 5,663,874 A | * | 9/1997 | Mader et al. | 363/21.14 |
| 5,747,976 A | * | 5/1998 | Wong et al. | 323/282 |
| 6,366,070 B1 | * | 4/2002 | Cooke et al. | 323/284 |
| 6,424,130 B1 | * | 7/2002 | Fukui | 323/282 |
| 6,495,995 B2 | * | 12/2002 | Groom et al. | 323/283 |
| 6,545,882 B2 | * | 4/2003 | Yang | 363/21.08 |
| 6,661,679 B1 | * | 12/2003 | Yang et al. | 363/41 |
| 7,071,665 B2 | * | 7/2006 | Tzeng et al. | 323/282 |
| 7,173,404 B2 | * | 2/2007 | Wu | 323/283 |
| 7,304,464 B2 | * | 12/2007 | Weng et al. | 323/285 |

OTHER PUBLICATIONS

Mano, Morris, Digital Logic and Computer Design, 1979, Prentice-Hall, 1st Edition, pp. 214-216.*

* cited by examiner

*Primary Examiner* — Harry Behm
(74) *Attorney, Agent, or Firm* — Perkins Coie LLP

(57) ABSTRACT

A technique for voltage regulation involves switching between light load mode and PWM mode based on load conditions. Advantageously, this improves efficiency at light load. In an embodiment, error amplifier output is used to determine whether load is light. When light load is detected, extend PWM off time until the output voltage reaches a load threshold.

6 Claims, 5 Drawing Sheets

PULSE FREQUENCY MODULATION METHODS AND CIRCUITS

CROSS-REFERENCE TO RELATED APPLICATIONS

This Application claims the benefit of U.S. Provisional Application No. 60/605,462 filed Aug. 30, 2004, which is incorporated by reference.

BACKGROUND

The advent of portable electronics and the need for longer battery life calls for new types of voltage regulators, which are very efficient in both low current and high current load conditions. For example, handheld devices such as PDA and cell phones can benefit from high efficiency in both standby and active modes to extend battery life. A very low amount of operating current is of particular importance in standby mode because the devices run in this mode most of the time.

A pulse width modulated (PWM) switching regulator is an efficient regulation scheme during heavy loads. PWM switching regulators offer high efficiency, low output voltage ripple, and good line and load regulation. However, at light loads the PWM regulator has poor efficiency because switching frequency related losses, such as FET switching loss, core loss, gate-drive loss, etc., are not concomitant with decreased output current due to unchanged switching frequency.

Efforts have been made to improve light load efficiency of switching regulators. One method is to operate the switching regulator intermittently based on load demand with fixed peak inductor current. Unfortunately, despite improved light load efficiency, this scheme inherently has a large output ripple voltage.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for voltage regulation involves switching between light load mode and PWM mode based on load conditions. Advantageously, this improves efficiency at light load. In an embodiment, error amplifier output is used to determine whether load is light because this signal is a good indicator of load conditions. When light load is detected, extend PWM off time until the output voltage reaches a load threshold.

The proposed circuits can offer, among other advantages, increasing battery lifetime, improved efficiency, or decreased loss. These and other advantages of the present invention will become apparent to those skilled in the art upon a reading of the following descriptions and a study of the several figures of the drawings.

BRIEF DESCRIPTION OF THE DRAWINGS

Embodiments of the invention are illustrated in the figures. However, the embodiments and figures are illustrative rather than limiting; they provide examples of the invention.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other methods, components, materials etc. In other instances, well-known structures, materials, implementations or operations are not shown or described in detail to avoid obscuring aspects of various embodiments of the invention.

Figure 1A:
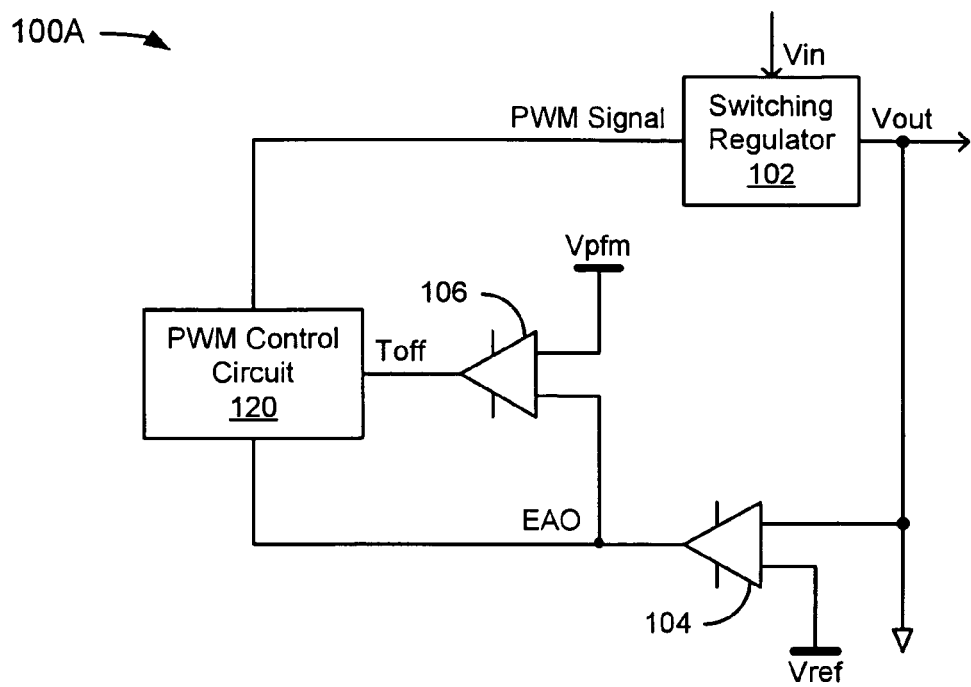
FIGS. 1A and 1B depict examples of systems with a dual mode switching regulator module.
Figure 1B:
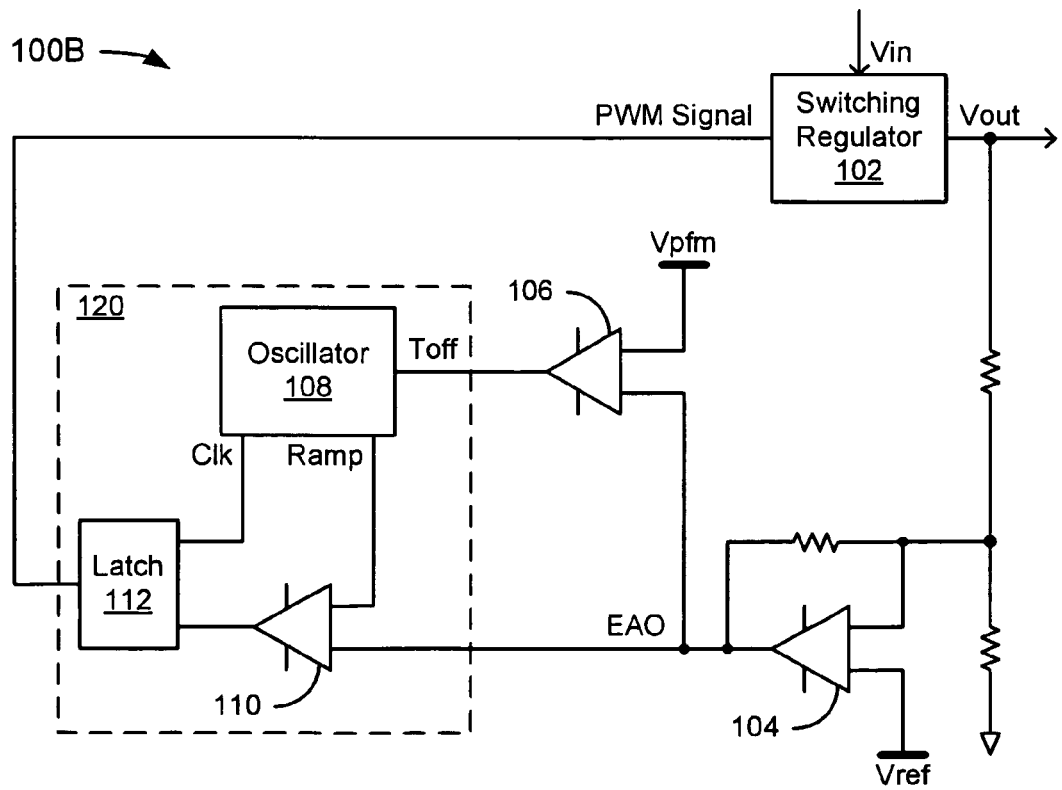

FIGS. 1A and 1B depict examples of systems 100A and 100B, respectively, with a dual mode switching regulator module.

FIG. 1A depicts an example of a system 100 with a dual mode switching regulator module. The system 100 includes a switching regulator 102, an error amplifier 104, a pulse frequency modulated (PFM) comparator 106, and a PWM control circuit 120. In the example of FIG. 1B, the PWM control circuit 120 includes an oscillator 108, a pulse width modulated (PWM) comparator 110, and a PWM latch 112. The systems 100A and 100B may be referred to collectively as the system 100. The components of the control circuit 120 are described below, but it should be noted that the PWM control circuit 120 can have a number of different implementations. The PWM control circuit 120 is not limited to the PWM control circuit 120 shown in the example of FIG. 1B. However, solely for the purposes of illustrative simplicity, the system 100 is treated as if the PWM control circuit 120 includes the components depicted in FIG. 1B. One of skill in the relevant art would understand that other implementations of the PWM control circuit 120 are possible.

In the example of FIG. 1B, depicted resistors are part of an RC network. The RC network behaves in a manner that one of skill in the art would understand. The resistors may be referred to as feedback resistors (the resistor coupled between an input of the error amplifier 104 and an output of the error amplifier 104 may be referred to as a compensation RC network resistor).

In the example of FIG. 1B, the switching regulator 102 has a voltage input (Vin) and a voltage output (Vout), and is coupled to the error amplifier 104 and the PWM latch 112. The error amplifier 104 feedbacks the output voltage through a series-parallel combination of resistors and capacitors. One or more of the resistors are optional, depending upon the implementation. A series-parallel combination of resistors and capacitors compensates the feedback loop stability and dynamics. The error amplifier 104 has the Vout input, a voltage reference (Vref) input, and an output signal. The error amplifier 104 output is coupled to the PFM comparator 106 and the PWM comparator 110.

In the example of FIG. 1B, the PFM comparator 106 has a PFM threshold voltage input, along with the output of the error amplifier 104, and a command signal (Toff) to extend off time of a clock signal. The output of the PFM comparator 106 is coupled to the oscillator 108. The oscillator 108 has a ramp signal output and a clock (Clk) signal output. The ramp signal output is coupled to the PWM comparator 110, along with the output of the error amplifier. The Clk signal is coupled to the PWM latch 112, along with output of the PWM comparator 110. The output of the PWM latch 112 is a PWM signal that is coupled to the switching network 102. The latch 112 may be implemented as any switching component such as, by way of example but not limitation, a transistor, an R-S flip-flop, etc.

In operation, the switching regulator 102 outputs Vout, which is sent as feedback to the error amplifier 104. The error amplifier output is compared to Vpfm at the PFM comparator 106. In a non-limiting embodiment, the Vpfm signal has a predetermined valued, but in alternative embodiments, the Vpfm signal may be set dynamically. The output of the PFM comparator 106 is evaluated before turning on the main switch. The results of the comparison are received at the oscillator 108, and Toff is treated as a control signal that is effective to extend clock off times when error amplifier output is low. Error amplifier output is associated with, for example, a load.

In operation, the oscillator 108 outputs the clock signal and the ramp signal. The length of clock off times and the length of ramp times depend upon Toff. In a non-limiting embodiment, if the clock off time is to be extended, then the ramp up time is also extended. The PWM comparator 110 compares the level of ramp signal of the oscillator 108 and the output of the error amplifier 104 and provides an input to the latch 112. The output of the PWM comparator 110 triggers the OFF time of the PWM signal. The other input to the latch 112 is the clock signal, and the latch outputs a PWM signal, which is input to the switching regulator 102. In a non-limiting embodiment, the clock signal generated by the oscillator 108 triggers the ON time of the PWM signal, which turns on the main switch S1 after going through a gate driver stage.

Advantageously, the system 100 enables a system to achieve improved efficiency during light load intervals. This can save power, including increasing battery life in portable electronic devices.

Figure 2:
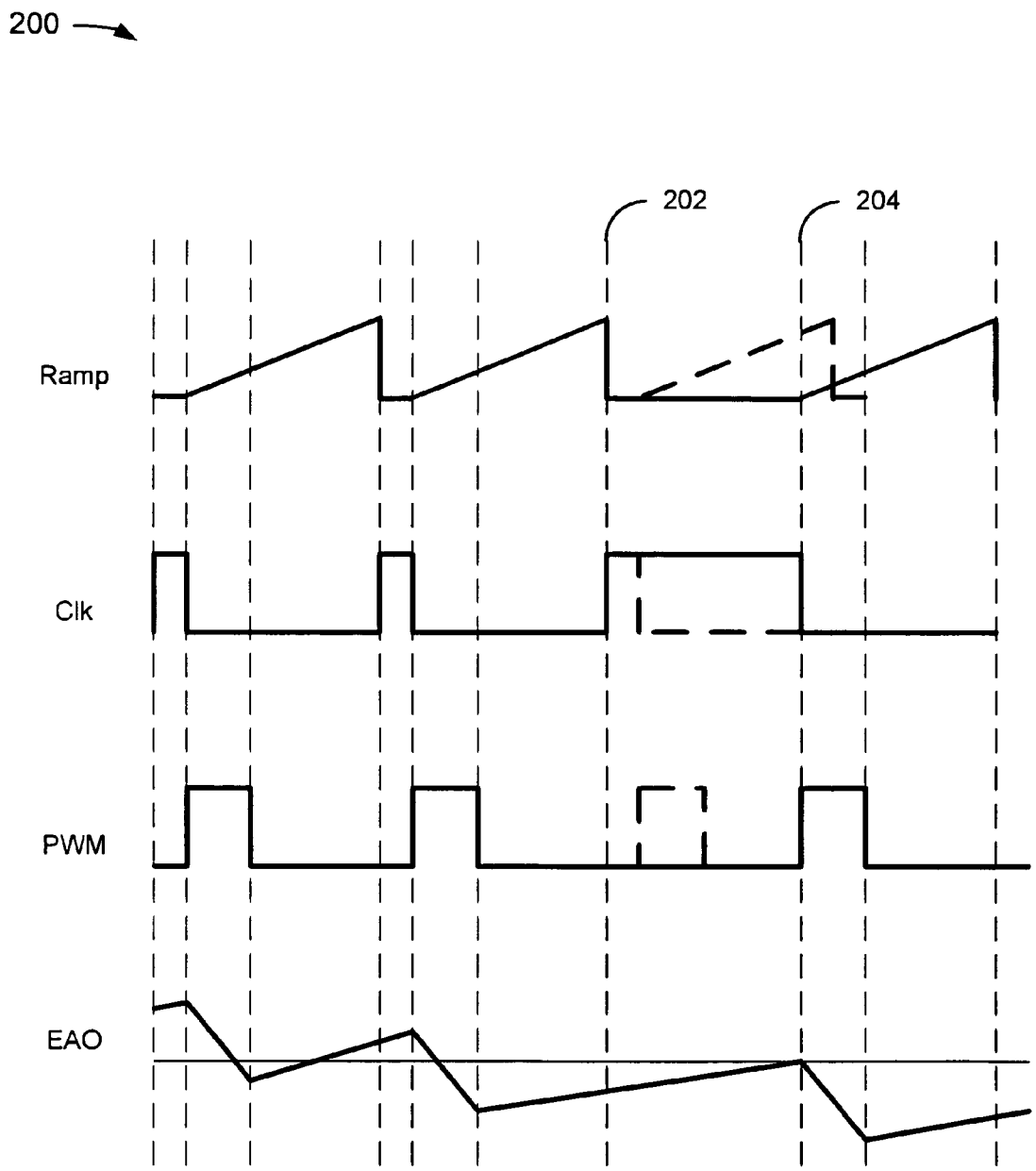
FIG. 2 depicts an example of various signals that may be generated by the system of FIG. 1.

FIG. 2 depicts an example of various signals that may be generated by the system 100. Other systems may have similar signal waveforms, or different, depending upon application-specific parameters and aspects. In the example of FIG. 2, the signals change from a signal that would correspond to a normal Toff to a Toff that corresponds to a light load. For example, the grid line 202 shows how the signal would continue (in dashed lines) if the Toff did not extend the clock off time. The grid line 204 shows how the signal actually continued in this example, according to a Toff that is associated with a longer clock off time.

As shown in the example of FIG. 2, the output of the error amplifier (EAO) has a ripple waveform, which decreases during the ON time of PWM signal, and increases during the OFF time of the PWM signal. For voltage mode control, at light load where the regulator runs at discontinuous conduction mode (DCM), the EAO level is proportional to the load current. In the example of FIG. 2, the comparison of the EAO level with the voltage level Vpfm is examined by a logic circuit within an oscillator, before turning on the main switch. The examination may or may not be triggered by the clock rising edge as shown in the example of FIG. 2, or by other timing events such as the zero crossing of inductor current, turning off the main switch, etc. If V(EAO) is larger than Vpfm, the load current is high enough that no PFM is needed, the clock falling edge triggers the PWM signal and a new switching cycle starts.

In a non-limiting embodiment, when the circuit runs at normal PWM operation, clock signal has a narrow pulse width. As load current decreases, the EAO drops as well. When the examination of comparison of EAO with Vpfm before turning on the main switch finds that V(EAO) is less than Vpfm, the load current is low enough for PFM operation. The clock pulse width is extended and correspondingly the OFF time of the PWM signal is also extended. During this time period, EAO voltage increases. Eventually it will cross the Vpfm threshold. When this happens, the clock signal falls down to trigger the ON time of the PWM signal and a new switching cycle starts. Extended OFF time of PWM signal can be gradually increased from zero to infinite with decreased load current. In this way, it may be possible to achieve close to zero frequency at light load. Light load may correspond to "no load," but in practical implementations, circuits always have some load.

Figure 3:
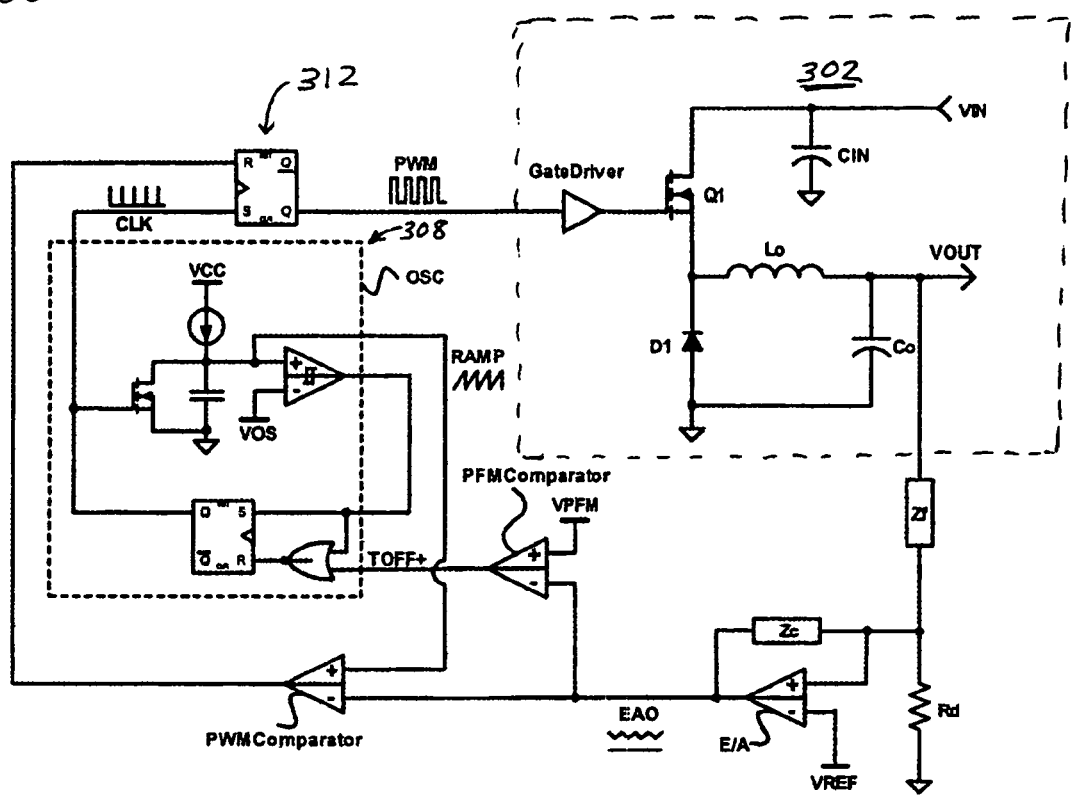
FIG. 3 depicts an alternative example of a system with a dual mode switching regulator module.
Figure 4:
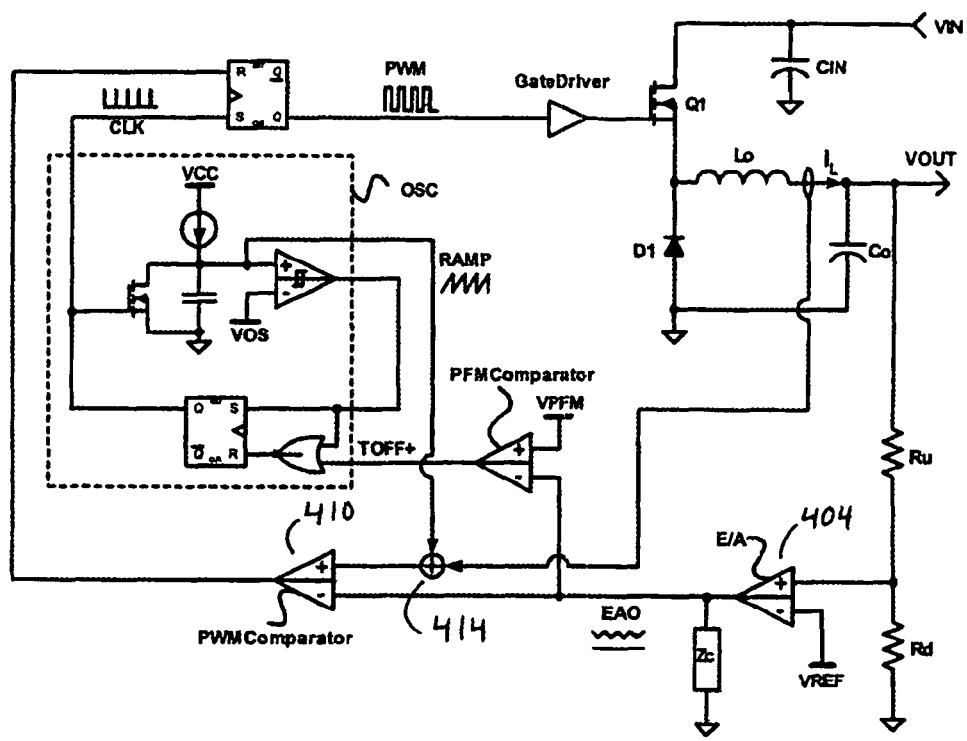
FIG. 4 depicts an alternative example of a system with a dual mode switching regulator module.
Figure 5:
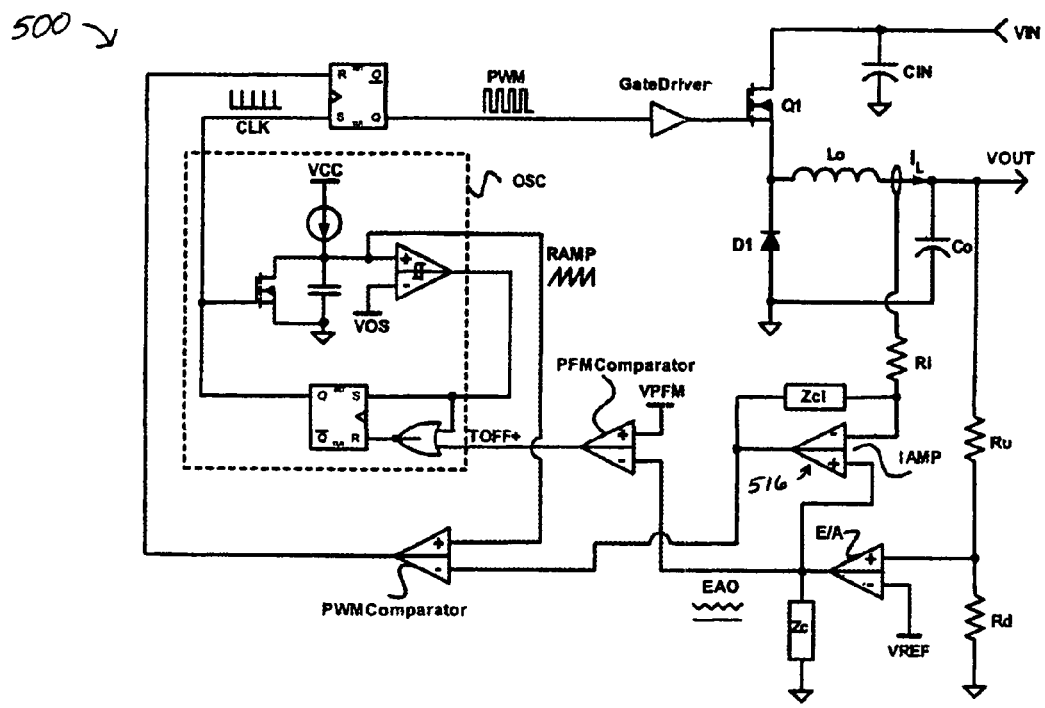
FIG. 5 depicts an alternative example of a system with a dual mode switching regulator module.

FIGS. 3, 4, and 5 depict alternative examples of systems 300, 400, and 500, respectively, with a dual mode switching regulator module. The systems 300, 400, and 500 are similar to the system 100.

In the example of FIG. 3, a switching regulator 302 is depicted in more detail that the switching regulator 102 (FIG. 1A). The switching regulator 302 may be implemented in a variety of ways, including by way of example but not limitation, buck, boost, buck-boost, flyback, forward, etc. In the example of FIG. 3, a buck regulator is depicted by way of example but not limitation. The switching device S1 may be implemented as a power MOSFET, rectification device D1 (may be a rectifier diode, or a synchronous rectifier MOSFET), inductor $L_0$, input capacitor CIN, and output capacitor Co, form the power stage of the buck regulator, which connects input terminal Vin to a supply source and output terminal Vout to a load.

An oscillator 308 is similarly depicted in more detail than the oscillator 108 (FIG. 1B). In the example of FIG. 3, the oscillator 308 includes a current source, timing capacitor, and a hysteresis comparator and a discharging switch. The principles described herein are applicable to any other logic circuit and oscillator topology. The latch 112 (FIG. 1B) is depicted as an R-S latch. The operation of the system 300 is similar to that of the system 100, described previously.

In the example of FIG. 4, a switching regulator 402 is similar to the switching regulator 302 (FIG. 3), but inductor current ($I_L$) may be sampled as labeled. The RC network near the error amplifier 404, which is similar to the error amplifier 104 (FIG. 1A), has a slightly different configuration, but one of skill in the relevant art would understand the significance. The ramp signal and $I_L$ are combined at 414, and provided as input to the PWM comparator 410, which is similar to the PWM comparator 110 (FIG. 1B).

The operation of the system 400 is similar to that of the system 100, but an additional current waveform is added to the ramp signal for easy loop compensation and cycle-by-cycle current limiting. The current could be sensed at the main switch or the inductor or other places and/or means. Due to the simplified loop frequency response, a transconductance amplifier could be used as the error amplifier instead of an operational amplifier. As shown, Ru and Rd form a voltage resistive divider for adjustable output voltage. A series-parallel combination of resistors and capacitors is connected between the output of error amplifier and ground. With peak current mode control, the output of the error amplifier is proportional to the load current over a whole range of load conditions. The operation of the system 400 is similar to that of the system 100, described previously.

In the example of FIG. 5, a current loop amplifier 516 is added. Instead of using sensed peak current as the control variable, the sensed inductor current goes through the current amplifier 516 to filter out the ripples so the averaged inductor current is used as the control variable. In this way, average current mode control is provided, rather than peak current mode control as in the example of FIG. 4.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A voltage regulation system, comprising:
    a switching regulator configured to convert an input voltage to an output voltage based on a pulse width modulation (PWM) signal;
    a feedback circuit coupled to the switching regulator, the feedback circuit being configured to generate an error signal corresponding to a difference between the output voltage and a reference voltage;
    a PWM control circuit configured to provide the PWM signal to the switching regulator, the PWM control circuit including a PWM comparator and an oscillator, wherein the oscillator is configured to generate a clock signal and a ramp signal, the clock signal having a leading edge, a falling edge, and a clock pulse width, the falling edge of the clock signal triggering an ON time of the PWM signal, and wherein the PWM comparator is configured to compare the ramp signal to the error signal and generate an ON time pulse width for the PWM signal;
    a pulse frequency modulation (PFM) comparator coupled to the PWM control circuit, the PFM comparator being configured to compare the error signal to a PFM threshold voltage and provide an output to the oscillator, wherein based on the output from the PFM comparator, the oscillator is configured to:
        generate the clock signal with the clock pulse width having a first value when the error signal is not less than the PFM threshold voltage; and
        generate the clock signal with the clock pulse width having a second value when the error signal is less than the PFM threshold voltage, the second value being greater than the first value.

2. The system of claim 1, wherein the switching regulator is one of a boost regulator, a buck regulator, a buck-boost regulator, a flyback regulator, or a forward regulator.

3. The system of claim 1, wherein the oscillator is configured to extend the ramp up time of the ramp signal based on the output from the PFM comparator.

4. The system of claim 1, wherein the error signal is proportional to a load current provided to a load connected to receive the output voltage.

5. The system of claim 1, wherein the feedback circuit comprises one of an operational amplifier or a transconductance amplifier.

6. The system of claim 1, wherein the switching regulator is further configured to generate a sensing current and wherein the ramp signal provided to the PWM comparator is based on a combination of the sensing current and the ramp signal generated by the oscillator.

* * * * *